United States Patent [19]

Meyer

[11] 4,419,609
[45] Dec. 6, 1983

[54] DEVICE FOR THE ATTENUATION OF THE MOVEMENT OF REEL MOTORS IN TAPE RECORDERS DURING STANDSTILL OF THE TAPE DRIVE ROLLER

[75] Inventor: Franz J. Meyer, Emmering, Fed. Rep. of Germany

[73] Assignee: Siemens Aktiengesellschaft, Berlin & Munich, Fed. Rep. of Germany

[21] Appl. No.: 413,811

[22] Filed: Sep. 1, 1982

Related U.S. Application Data

[63] Continuation of Ser. No. 179,110, Aug. 18, 1980, abandoned.

[30] Foreign Application Priority Data

Sep. 12, 1979 [DE] Fed. Rep. of Germany ....... 2936937

[51] Int. Cl.³ ............................................. H02P 3/08
[52] U.S. Cl. ..................................... 318/7; 318/365; 318/452
[58] Field of Search ................ 318/6, 7, 71, 365, 452; 242/186, 191; 360/74.2

[56] References Cited

U.S. PATENT DOCUMENTS

| | | | |
|---|---|---|---|
| 3,342,430 | 9/1967 | Murphy | 318/7 |
| 3,906,299 | 9/1975 | Mittelstaedt | 318/7 |
| 4,000,804 | 1/1977 | Zaltieri | 318/7 X |
| 4,034,272 | 7/1977 | Steward | 318/7 |
| 4,063,139 | 12/1977 | Miller | 318/7 X |
| 4,079,296 | 3/1978 | Dahlen et al. | 318/7 |
| 4,126,817 | 11/1978 | Luzio | 318/7 |
| 4,129,810 | 12/1978 | Harshberger, Jr. | 318/6 X |

*Primary Examiner*—J. V. Truhe
*Assistant Examiner*—Richard M. Moose
*Attorney, Agent, or Firm*—Hill, Van Santen, Steadman & Simpson

[57] ABSTRACT

Device for the attenuation of the movement of the reel motors in recording devices during standstill of the tape capstan drive roller. The regulation of the reel motors proceeds during the normal run of the tape via the motor current and during the standstill of the capstan drive via the voltage which lies at the reel motors.

5 Claims, 1 Drawing Figure

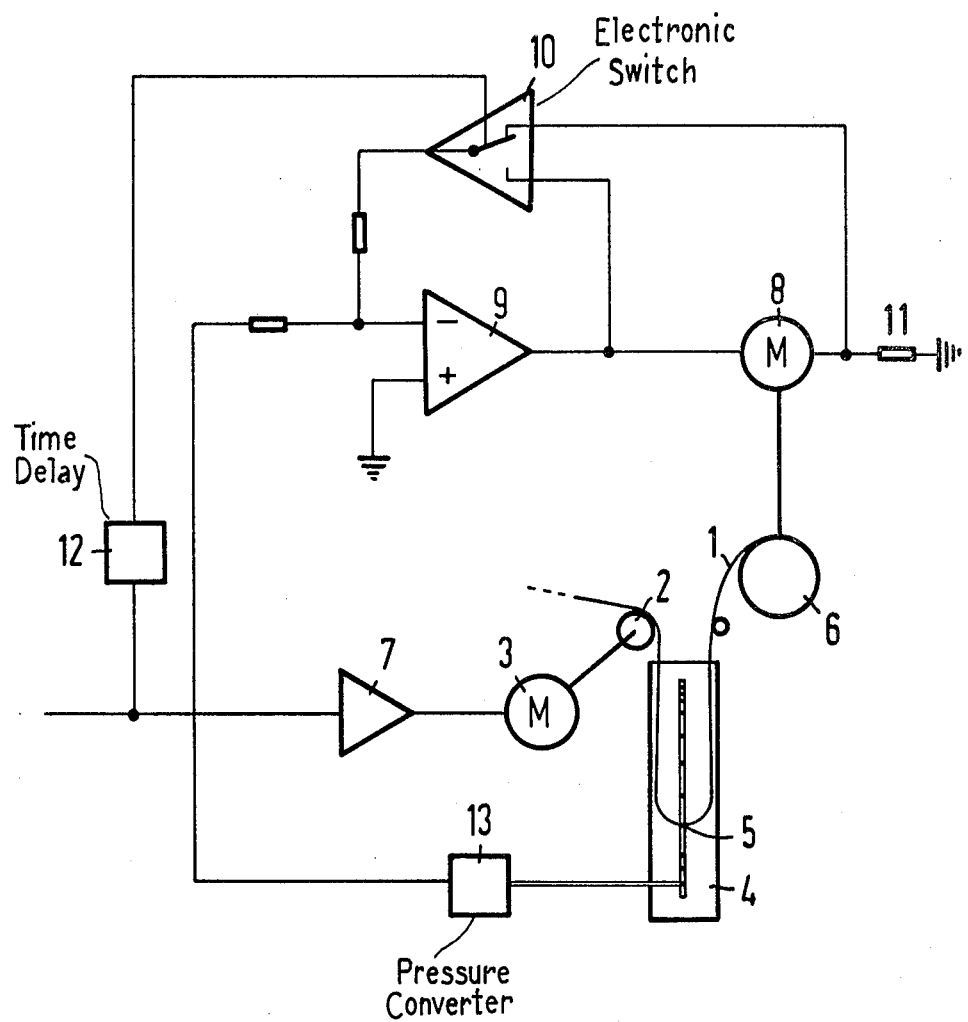

DEVICE FOR THE ATTENUATION OF THE MOVEMENT OF REEL MOTORS IN TAPE RECORDERS DURING STANDSTILL OF THE TAPE DRIVE ROLLER

This is a continuation of application Ser. No. 179,110, filed Aug. 18, 1980, now abandoned.

BACKGROUND OF THE INVENTION

The invention concerns a device for the attenuation of the movement of the tape tensioning motors in tape recorders during standstill of the tape drive roller.

In the case of the reel drives in magnetic tape devices, in general the regulation of the reel (or tape tensioning) motors via the motor current prevailed and not via the motor voltage, because thereby the torque which is proportional to the motor current is always under control. In the case of the regulation via the motor voltage, the current and thus also the torque for motor and reel could become damagingly high when the voltage applied to the motor acts in the same direction as the electromotive force of the motor.

The current regulation for the reel motors, however, has the disadvantage that in the case of standstill of the drive roller (capstan), the reels do not stand still. This leads to unnecessary wear at all friction points of the tape in the buffer chambers which as a rule are present in such devices and at the tape guide locations. The restlessness of the reel is to be attributed to the following causes:

If the tape loop of the magnetic tape is located exactly in the middle of the buffer chamber, then the current is regulated down in the associated reel motor by the regulating device to the value zero. The underpressure which prevails in the buffer chamber under the tape loop draws the tape loop, however, in the direction of the chamber floor. Conditioned by the unavoidable hysteresis of the loop position sensors, this migration of the tape loop from the middle of the buffer chamber is recognized only after traveling of a certain distance. Following this, the regulating unit attempts to correct the position of the tape loop again in such a manner that the tape loop is located in the middle of the buffer chamber. If the tape loop then again has arrived in the middle of the buffer chamber, the motor current is again regulated down to zero. As a result of the mass moment of inertia of the reel (with its coil of tape), of the reel motor and of the reel turntable, however, the reel and thus also the tape loop in the buffer chamber again moves away from the middle. Only when the adjacent sensor in the buffer chamber is exceeded or the reel is braked by the tape tension, again a current flows through the tape tensioning motor, which moves the loop again toward the middle of the buffer chamber. Within the hysteresis range, the motor is completely unattenuated and it thus moves constantly.

SUMMARY OF THE INVENTION

The invention was thus based upon the problem of creating a device for the attenuation of the movement of the reel (or tape tensioning) motors in recording devices during standstill of the tape drive roller. The invention thereby proceeds from the knowledge that in the case of a voltage regulation, whereby not the current but rather the voltage is regulated by the sensors in the buffer chamber, with the positioning of the tape loop in the buffer chamber, the voltage lying at the associated reel motor is zero, that is, the motor is short circuited. Such a short circuit however brings about an attenuation of the movement of the motor within the hysteresis range of the loop sensors in the buffer chamber. According to the present invention, therefore, the problem set forth above is thereby solved, that the reel (tape tensioning) motors during the normal run of the tape are controlled via the motor current which flows in them; during the standstill of the tape drive roller, on the other hand, they are controlled via the voltage which lies at them.

Other objects, features and advantages of the invention will be apparent from the following detailed description taken in connection with the accompanying drawings, and from the appended claims.

BRIEF DESCRIPTION OF THE DRAWING

The single FIGURE is a diagrammatic showing of the pertinent parts of a tape transport with a control system in accordance with the present invention.

DETAILED DESCRIPTION

The drawing shows schematically a part of a magnetic recorder, in the case of which, in a manner which is known per se, a magnetic tape 1 is driven with the help of a capstan drive roller 2 which is driven by a motor 3, from a reel 6 through a buffer chamber 4. In the buffer chamber 4, the tape forms a tape loop 5. The capstan drive roller motor 3 is driven in a known manner via a servo amplifier 7. In a manner which is also known, the reel 6 is driven by a motor 8, which is driven by a servo amplifier 9. In the case of the reel drives in magnetic tape recorders, the regulation of the reel motors via their motor current has prevailed, which regulating occurs in the case of the device which is presented thereby, that the voltage drop which occurs at the resistance 11 and is proportional to the motor current is supplied to the servo amplifier as input quantity. As was explained above, however, this type of regulating has the disadvantage for the reel or tape tensioning motor 8 that in the case of standstill of the capstan drive roller 2, the reel 6 does not stand still. Therefore, according to the invention, the reel or tape tensioning motors during the normal run of the tape are regulated via the motor current which flows in them, and during the standstill of the tape drive roller 2 are regulated via the voltage which lies at them. In the case of the embodiment example, this occurs thereby, that an electronic switch 10 is provided, which during the normal run of the tape supplies the voltage, which drops at the resistor 11 and is proportional to the motor current, to the servo amplifier 9 for the reel motor 8 as input quantity; during the standstill, on the other hand, after switchover, it supplies the voltage which lies at the connection point between output of the servo amplifier 9 and input of the motor 8.

It has proved to be especially advantageous to not switch over the electronic switch 10 immediately upon standstill of the tape drive roller 2, but rather only after a certain delay time, in which the tape loop 5 is in the position of assuming its position in the middle of the buffer chamber 4. For this purpose, between the input of the servo amplifier 7 and the electronic switch 10, a time delay device 12 is connected, which switches over the electronic switch only after a specific delay time.

In the embodiment example which is shown, the buffer chamber was only indicated schematically, and in particular, is was indicated that the position of the tape loop 5 within the buffer chamber 4 is determined with the help of openings which are located in the chamber back wall and with the help of a pressure converter 13 in a manner which is known per se. Instead of this, of course, also a scanning of the loop position can proceed with the help of optical elements, and, above and beyond this, the invention is also advantageous in the case of purely analog tape loop scanning if this displays a certain hysteresis, which as a rule is the case.

It will be apparent that many modifications and variations may be effected without departing from the scope of the novel concepts and teachings of the present invention.

I claim as my invention:

1. In a tape transport system for tape recorders including a capstan drive means for driving the tape, tape tensioning motor means responsive to motor current to control tape tension, buffer chamber means for receiving a loop of the tape between the capstan drive means and tape tensioning motor means, wherein the improvement comprises: circuitry means for the attenuation of the movement of the tape tensioning motor means after cessation of tape drive and for prevention of a constant movement of the tape loop in the buffer chamber means, said circuitry means regulating said tape tensioning motor means during tape drive via control of the motor current which flows in said tape tensioning motor means, and after said cessation of tape drive via control of the voltage at said tape tensioning means so as to attenuate movement of the tape loop in the buffer chamber means.

2. A system according to claim 1 wherein said circuitry means comprises resistance for sensing motor current flow in said tape tensioning motor means and having a first connection point with said tape tensioning motor means, servo amplifier means having a second connection point connected with its output and connecting with said tape tensioning motor means, and electronic changeover switch means which during tape drive connects the input of the servo amplifier means with the first connection point between said resistance means and the motor means to provide for control of motor current of said motor means, and after cessation of tape drive connects the input of the servo amplifier means with the second connection point between the tape tensioning motor means and the output of the servo amplifier means to provide for control of the voltage at said motor means.

3. A system according to claim 2 wherein said circuitry means further comprises a capstan control servo amplifier means for controlling operation of said capstan drive means, an input line for control signals connected with the input of the capstan control servo amplifier means, and a time delay means which is connected between the input of the capstan control servo amplifier means and the electronic switch means for delaying switchover of said electronic switch means in response to a cessation of a tape drive by the capstan drive means.

4. A tape transport system for a tape recorder, comprising:
capstan drive means for driving a tape of the tape recorder;
a tape tensioning reel having a motor connected thereto;
between said capstan drive means and tape tensioning reel a buffer chamber means being provided; and
a switchable feedback circuit means employing a servo amplifier means for controlling the tape tension reel motor, said feedback circuit means sensing motor current of the tape tensioning reel motor during driving of the tape by the capstan drive means for regulating the reel motor, and after cessation of tape drive said feedback circuit means sensing voltage applied to the motor of the tape tensioning reel so as to prevent fluctuation of the tape tension reel and a constant change of position of a tape loop in the buffer chamber.

5. The system according to claim 4, wherein the switchable feedback circuit means has a time delay means for switching a switch after a given time delay after a capstan drive means stops driving.

* * * * *